(12) United States Patent
Vazquez et al.

(10) Patent No.: US 8,854,683 B2
(45) Date of Patent: Oct. 7, 2014

(54) APPARATUS AND METHODS TO CODE PRINT DATA

(75) Inventors: Jorge Martinez de Salinas Vazquez, San Francisco, CA (US); Joan Vidal Fortia, Barcelona (ES); Lluis Abello Rosello, Tarragona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 98 days.

(21) Appl. No.: 13/475,145

(22) Filed: May 18, 2012

(65) Prior Publication Data
US 2013/0308143 A1 Nov. 21, 2013

(51) Int. Cl.
*G06F 15/00* (2006.01)
*G06K 15/02* (2006.01)
*G06K 1/00* (2006.01)

(52) U.S. Cl.
USPC .......................................... 358/1.2; 358/1.15

(58) Field of Classification Search
USPC .................. 358/1.9, 1.13, 1.15, 1.14, 1.2
See application file for complete search history.

(56) References Cited

U.S. PATENT DOCUMENTS

| 6,867,878 | B1 | 3/2005 | Norton |
| 7,710,605 | B2 | 5/2010 | Yamamoto |
| 7,940,427 | B2 | 5/2011 | Takemura |
| 8,004,705 | B2 | 8/2011 | Nakayama |
| 8,477,339 | B2 * | 7/2013 | Suzuki .......................... 358/1.15 |

FOREIGN PATENT DOCUMENTS

| JP | 2006044045 A | 2/2006 |
| JP | 2007228067 A | 9/2007 |

* cited by examiner

*Primary Examiner* — Douglas Tran

(57) ABSTRACT

A method to code print data where print data to control a print head of a printer is received, where a coding strategy to change the size of the print data is determined based on at least one characteristic of a print mode of the printer, and the size of the print data is changed using the determined coding strategy.

20 Claims, 4 Drawing Sheets

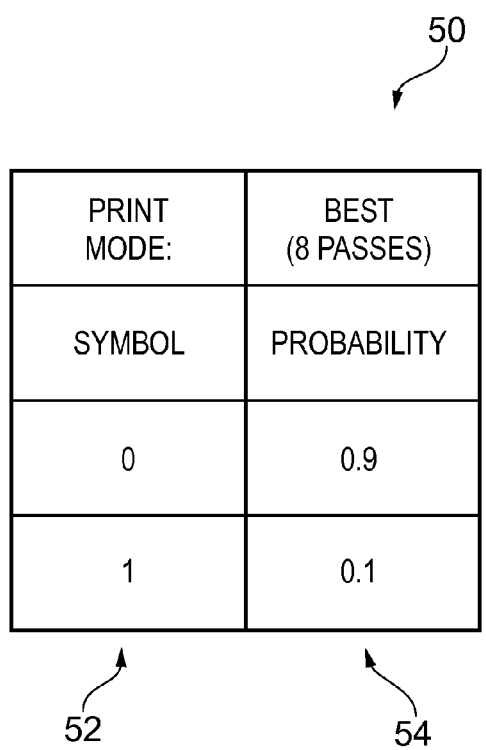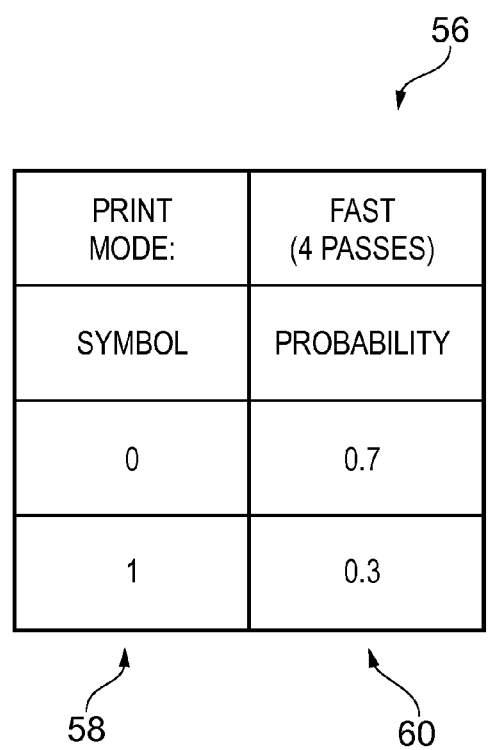
FIG. 3A
FIG. 3B

APPARATUS AND METHODS TO CODE PRINT DATA

BACKGROUND

Print systems usually include an electronic device and a printer coupled by a wired link (such as a cable) and/or a wireless link (such as a wireless local areas network). The electronic device is arranged to image process print jobs (for example, rastering a print job) and then provide the image processed print job to the printer for printing. However, such print systems may require high data rates between the electronic device and the printer to transfer the print job and this may increase the cost of the print system.

BRIEF DESCRIPTION

Reference will now be made by way of example only to the accompanying drawings in which:

FIG. 3A illustrates a first coding strategy according to an example;

FIG. 3B illustrates a second coding strategy according to an example;

DETAILED DESCRIPTION

Figure 1:
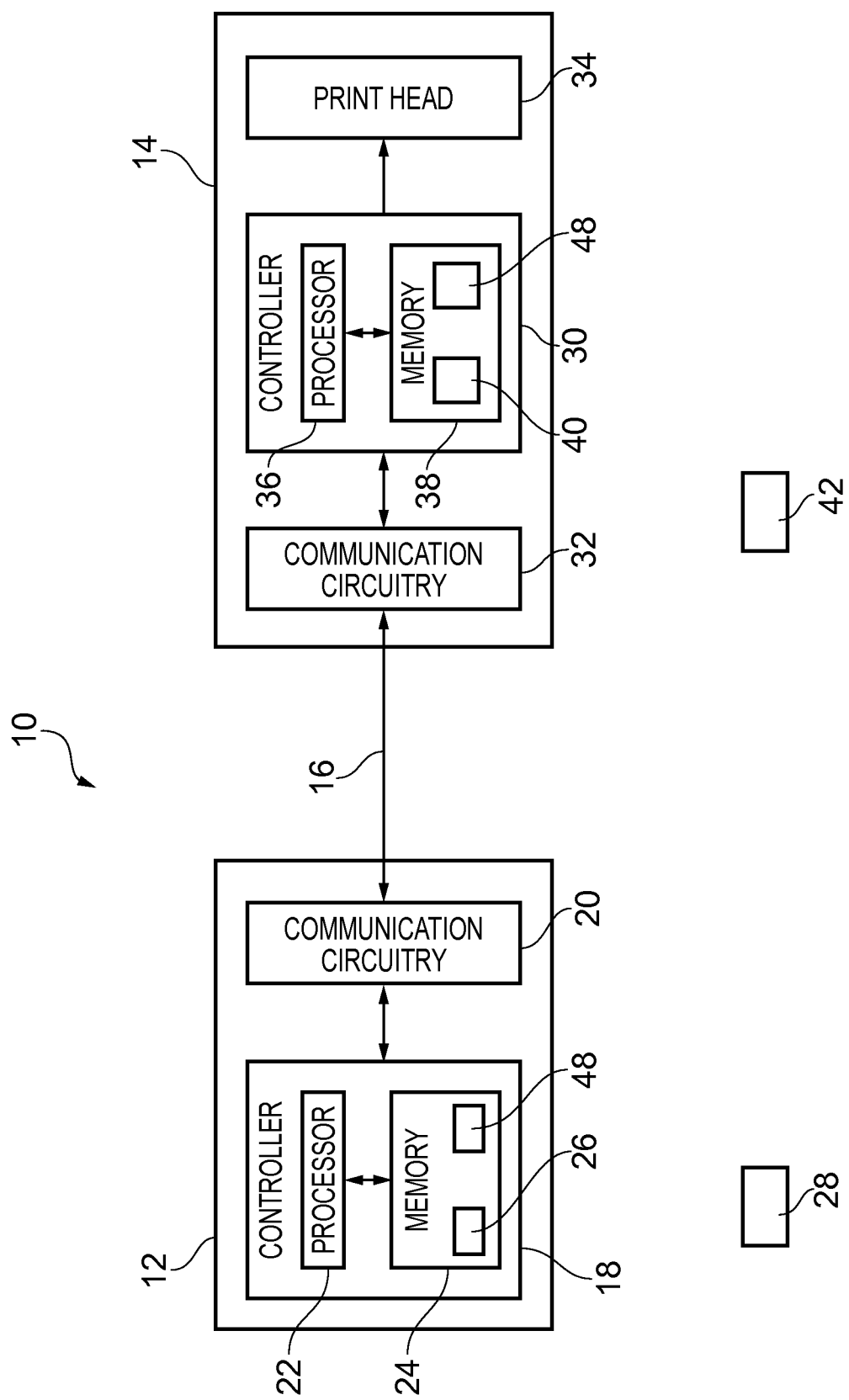
FIG. 1 illustrates a schematic diagram of a print system according to an example.

FIG. 1 illustrates a schematic diagram of a print system 10 including an electronic device 12 and a printer 14. The electronic device 12 and the printer 14 are coupled via a communication link 16 which may be a wired link (such as a cable) or a wireless link (such as a local wireless area network).

The electronic device 12 may be any suitable apparatus for image processing a print job and providing the print job to the printer 14. For example, the electronic device 12 may be a desktop personal computer, a laptop personal computer, a tablet computer, a hand held device, or a module for such devices. In some examples, the print system 10 is a printing device and the electronic device 12 is an image processor of the printing device and the printer 14 is a print head of the printing device that includes at least one print head die.

The electronic device 12 includes a controller 18 and communication circuitry 20. The implementation of controller 18 can be in hardware alone (a circuit, a processor and so on), have certain aspects in software including firmware alone or can be a combination of hardware and software (including firmware). In various examples, the controller 18 may be an application specific integrated circuit (ASIC) or a field programmable gate array (FPGA).

The controller 18 may be implemented using instructions that enable hardware functionality, for example, by using executable computer program instructions in a general-purpose or special-purpose processor 22 that may be stored on a computer readable storage medium 24 (disk, memory etc) to be executed by such a processor 22.

The processor 22 is configured to read from and write to the memory 24. The processor 22 may also comprise an output interface via which data and/or commands are output by the processor 22 and an input interface via which data and/or commands are input to the processor 22.

The memory 24 stores a computer program 26 comprising computer program instructions that control the operation of the electronic device 12 when loaded into the processor 18. The computer program instructions 26 provide the logic and routines that enables the electronic device 12 to perform the method illustrated in FIG. 3. The processor 22 by reading the memory 24 is able to load and execute the computer program 26.

The computer program 26 may arrive at the electronic device 12 via any suitable delivery mechanism 28. The delivery mechanism 28 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 26. The delivery mechanism may be a signal configured to reliably transfer the computer program 26. The electronic device 12 may propagate or transmit the computer program 26 as a computer data signal.

Although the memory 24 is illustrated as a single component it may be implemented as one or more separate components some or all of which may be integrated/removable and/or may provide permanent/semi-permanent/ dynamic/cached storage.

The communication circuitry 20 is arranged to receive data from the controller 18 and transfer the data to the printer 14 via the communication link 16. The communication circuitry 20 may be circuitry for a wired link (such as Universal Serial Bus circuitry) or may be circuitry for a wireless link (such as wireless local area network circuitry or Bluetooth circuitry).

The printer 14 may be any printer or a module for any printer (such as a print head comprising at least one print head die as described above). For example, the printer 14 may be an inkjet printer, a laser printer, a lithographic printer, an LED printer, a solid ink printer or a dye sublimation printer. The printer 14 includes a controller 30, communication circuitry 32 and a print head 34.

The printer 14 is arranged to operate in a plurality of different print modes that determine the quality of text and images printed on a substrate by the printer 14 and how fast they are printed on the substrate. The different print modes are defined by at least one characteristic such as printing resolution, redundancy or number of passes by the print head 34. The print mode may be selected by a user of the electronic device 12, or may be selected automatically by the printer 14 (for example, in response to determining the quality of the substrate inserted in the printer 14)

The controller 30 is similar to the controller 18. The controller 18 may be an application specific integrated circuit (ASIC), a field programmable gate array (FPGA) or include at least one processor 36 and at least one memory 38.

Where the controller 30 includes a processor 36 and a memory 38, the processor 36 is configured to read from and write to the memory 38. The memory 38 stores a computer program 40 comprising computer program instructions that control the operation of the printer 14 when loaded into the processor 36. The computer program instructions 40 provide the logic and routines that enables the printer 14 to perform the method illustrated in FIG. 4. The processor 36 by reading the memory 38 is able to load and execute the computer program 40.

The computer program 40 may arrive at the printer 14 via any suitable delivery mechanism 42. The delivery mechanism 42 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 40. The delivery mechanism 42 may be a signal configured to reliably transfer the computer program 40. The printer 14 may propagate or transmit the computer program 40 as a computer data signal.

The communication circuitry 32 is arranged to receive data from the electronic device 12 via the communication link 16 and provide the data to the controller 30. The communication circuitry 32 may be circuitry for a wired link (such as Universal Serial Bus circuitry) or may be circuitry for a wireless link (such as wireless local area network circuitry or Bluetooth circuitry).

The print head 34 may be any apparatus that prints on a substrate (i.e. any apparatus that may apply ink, toner etc. to a substrate to form text and images on the substrate). The print head 34 may be, for example, a print head for an inkjet printer, a laser printer, a lithographic printer, an LED printer, a solid ink printer or a dye sublimation printer. The controller 30 is arranged to use data received from the communication circuitry 32 to control the print head 34 to print on a substrate.

The operation of the print system 10 is described in the following paragraphs with reference to FIGS. 1 to 4.

Figure 2:
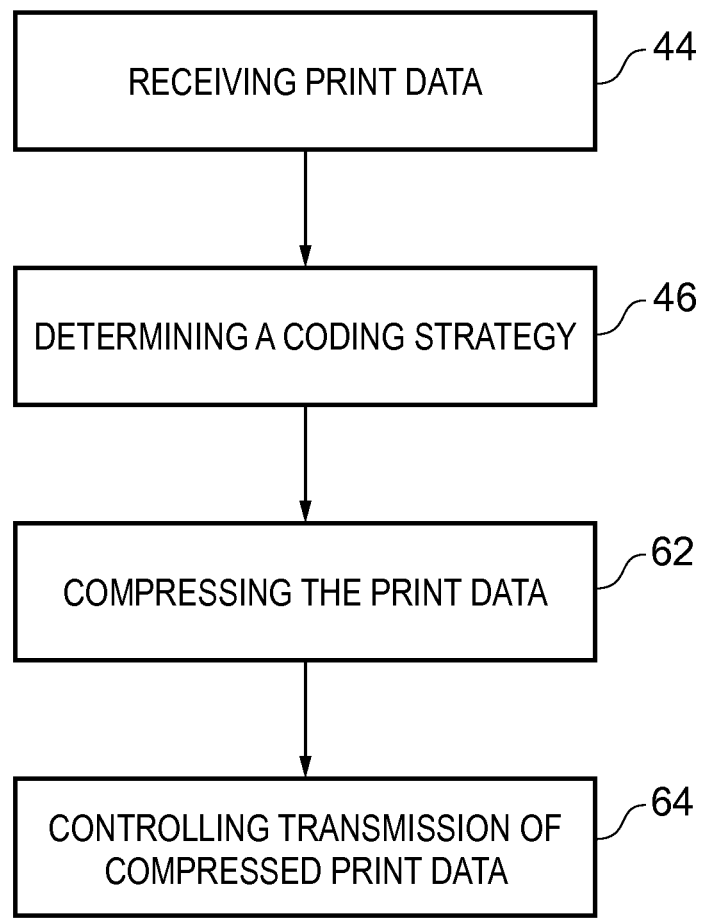
FIG. 2 illustrates a flow diagram of a method according to an example.

FIG. 2 illustrates a flow diagram of a method according to an example. At block 44, the controller 18 receives print data. In some examples, a further controller (not illustrated) is arranged to generate print data and provide the print data to the controller 18. In other examples, a first functional part of the controller 18 generates the print data and provides the print data to a second functional part of the controller 18. The print data may be masked halftone data and hence be in a format that may not require any further image processing to be used by the printer 14 to print on a substrate.

At block 46, the controller 18 determines a coding strategy for the received print data based on at least one characteristic of a print mode of the printer 14. The coding strategy may be any suitable coding for compressing and decompressing the print data. For example, the coding strategy may be arithmetic coding or Huffman coding. In this example, the coding strategy is a lossless coding strategy, but may be a lossy coding strategy in other examples.

In some examples, block 46 includes determining a coding strategy by selecting a coding strategy from a plurality of coding strategies 48 stored on the memory 24. The different coding strategies of the plurality of coding strategies 48 may correspond to the different print modes of the printer 14. The plurality of coding strategies 48 may be generated by printer 14 and provided to the memory 24 via the communication link 16. Alternatively, the plurality of coding strategies 48 may be generated by the electronic device 12 (given knowledge of the print modes of the printer 14) and stored in the memory 14.

In other examples, block 46 includes determining a coding strategy by generating a coding strategy in response to receiving the print data. In these examples, the controller 18 generates the coding strategy using the existing print mode of the printer 14 or using the print mode selected by the user for the print data (if different to the existing print mode). In arithmetic coding, the controller 18 analyses the characteristics of the print mode and estimates the probability that the '0' symbol occurs in the print data (indicating that ink should not be provided) and estimates the probability that the '1' symbol occurs in the print data (indicating that ink should be provided). For example, when the number of printing passes is higher, it means that less ink is printed in each pass, and therefore the probability of '0' in the print data is higher and the probability of '1' in the print data is lower.

FIG. 3A illustrates a first coding strategy according to an example. The first coding strategy includes a lookup table 50 for use in arithmetically compressing print data for a 'best' print mode (8 passes with high print resolution). The lookup table 50 includes a first column 52 for a symbol of the print data and a second column 54 for the probability that a symbol is present in the print data. The symbol '0' has a probability of 0.9, and the symbol '1' has a probability of 0.1.

FIG. 3B illustrates a second coding strategy according to an example. The second coding strategy includes a lookup table 56 for use in arithmetically compressing print data for a 'fast' print mode (4 passes with lower print resolution than the 'best' print mode). The lookup table 56 includes a first column 58 for a symbol of the print data and a second column 60 for the probability that a symbol is present in the print data. The symbol '0' has a probability of 0.7, and the symbol '1' has a probability of 0.3.

Returning to FIG. 2, at block 62 the controller 18 compresses the print data using the determined coding strategy. For example, to encode the sequence 00 in the print data using arithmetic coding and the first coding strategy for the 'best' print mode, the interval (or state) of the controller 18 (which functions as a compressor) is set to [0,100]. A 0 is received and the interval is updated to [0, 90] (since the probability of a 0 is 0.9). Another 0 is received and the interval is updated to [0, 81]. The sequence 00 is subsequently encoded by the controller 18 with the interval [0, 81].

At block 64, the controller 18 controls the communication circuitry 20 to transmit the compressed print data to the printer 14 via the communication link 16.

Figure 4:
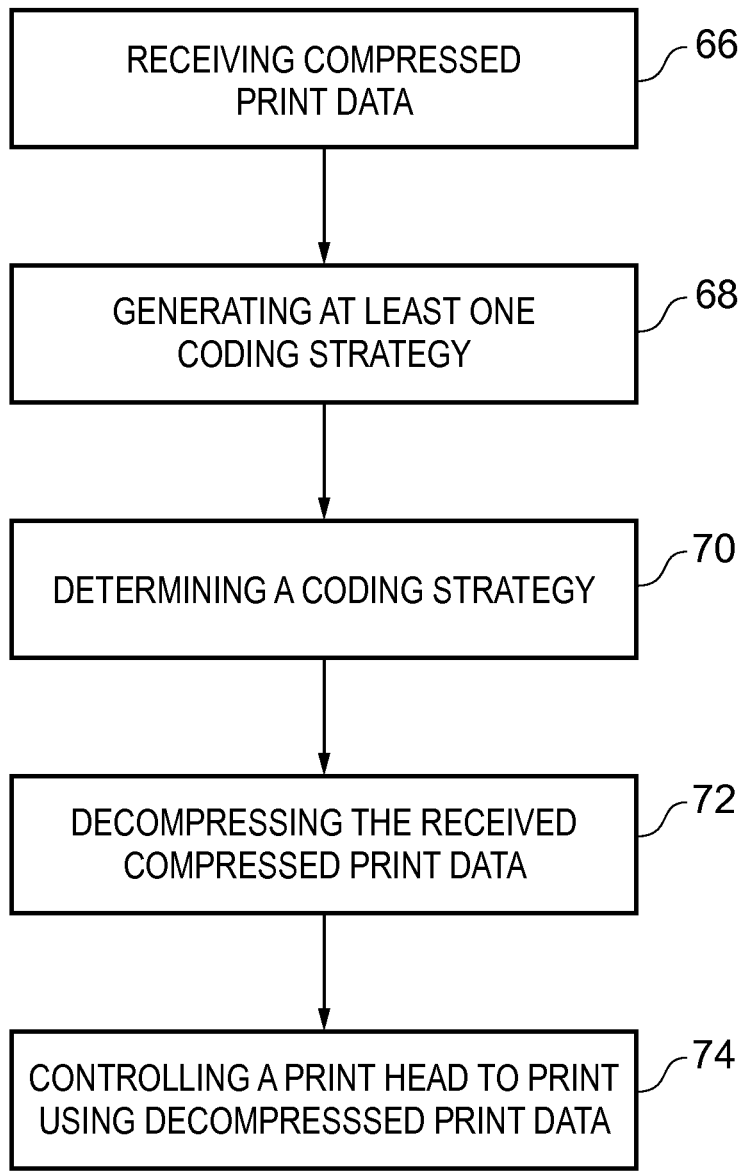
FIG. 4 illustrates a flow diagram of another method according to an example.

FIG. 4 illustrates a flow diagram of another method according to an example. At block 66, the controller 30 receives the compressed print data from the electronic device 12 via the communication circuitry 32.

At block 68, the controller 30 generates at least one coding strategy for at least one print mode of the printer 14 (as described in the preceding paragraphs for example) and stores the at least one coding strategy 48 in the memory 38. The at least one coding strategy 48 may be generated in response to receiving the compressed print data from the electronic device 12 or may be generated prior to receiving the compressed print data. The controller 30 is arranged to control communication circuitry 32 to provide the generated coding strategies 48 to the electronic device 12 for storage in the memory 24.

At block 70, the controller 30 determines a coding strategy based on at least one characteristic of a print mode of the printer 14. In some examples, the controller 30 selects a coding strategy from the plurality of coding strategies 48 stored on the memory 38 based on a characteristic of the print mode of the printer 14. In other examples, the controller 30 generates a coding strategy in response to the received compressed print data (that is, in these examples, block 70 includes block 68).

At block 72, the controller 30 functions as a decompressor and decompresses the received compressed print data using the determined coding strategy. It should be appreciated that the controller 30 uses the same coding strategy as the controller 18 and consequently, the decompressed print data corresponds to the uncompressed masked halftone print data in the electronic device 12. Furthermore, where the coding strategy is a lossless coding strategy, the decompressed print data is the same as the uncompressed masked halftone print data in the electronic device 12.

At block 74, the controller 30 controls the print head 34 to print on a substrate using the decompressed print data.

The print system 10 provides an advantage in that since print data is compressed when transmitted from the electronic device 12 to the printer 14, the data rate at the printer 14 may be reduced and this may advantageously result in the printer 14 having less complex (and less costly) electronic parts. Additionally, the communication link 16 may advantageously have a lower data transfer rate and may advantageously comprise less costly cables, less cables and/or less costly technology (for example, copper may be used instead of fibre optics). Alternatively, the data transfer rate of the communication link 16 may be maintained to advantageously enable more print data to be transferred to the printer 14 in a given time period. This may enable the controller 30 to drive the print head 34 at a higher speed while maintaining the cost of the printer 14.

The blocks illustrated in the FIGS. 3 and 4 may represent steps in a method and/or sections of code in the computer programs 26 and 40 respectively. The illustration of a particular order to the blocks does not necessarily imply that there is a required or preferred order for the blocks and the order and arrangement of the block may be varied. Furthermore, it may be possible for some blocks to be omitted.

Although examples have been described in the preceding paragraphs, it should be appreciated that modifications to the examples given can be made without departing from the scope of the invention as claimed.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   receiving, by an electronic device from a printer, information about a plurality of different coding strategies for the printer;
   receiving, in the electronic device, print data to control a print head of the printer;
   selecting, by the electronic device based on at least one characteristic of a print mode of the printer, a coding strategy from the plurality of coding strategies; and
   compressing, by the electronic device, the print data using the selected coding strategy.

2. A method as claimed in claim 1, wherein selecting the coding strategy from the plurality of coding strategies is in response to receiving the print data.

3. A method as claimed in claim 1, further comprising controlling, by the electronic device, transmission of the compressed print data to the printer.

4. A method as claimed in claim 1, wherein the selected coding strategy includes a lookup table identifying a print mode and probabilities of the print data including zeros and ones.

5. A method as claimed in claim 1, wherein the received print data includes masked half tone data.

6. A method as claimed in claim 1, wherein the selected coding strategy is a lossless data compression strategy.

7. A method as claimed in claim 1, wherein the at least one characteristic of the print mode is a resolution of the printer, wherein selecting the coding strategy from the plurality of coding strategies is based on at least the resolution of the printer.

8. A method as claimed in claim 1, wherein the at least one characteristic of the print mode is a number of passes of the print head in printing print data to a substrate, and wherein selecting the coding strategy from the plurality of coding strategies is based on the number of passes.

9. A method to decompress print data comprising:
   receiving, by a printer from an electronic device, compressed print data to control a print head of the printer;
   selecting, by the printer based on at least one characteristic of a print mode of the printer, a coding strategy from a plurality of coding strategies, the at least one characteristic of the print mode selected from among a resolution of the printer, and a number of passes of the print head in printing print data to a substrate; and
   decompressing, by the printer, the received compressed print data using the selected coding strategy.

10. A method as claimed in claim 9, wherein selecting the coding strategy from the plurality of coding strategies is performed in response to receiving the compressed print data.

11. A method as claimed in claim 9, further comprising controlling the print head to print using the decompressed print data.

12. A method as claimed in claim 9, wherein the decompressed print data is masked half tone data.

13. A method as claimed in claim 9, further comprising:
   sending, by the printer to the electronic device, information about the plurality of coding strategies for selection by the electronic device in compressing print data for sending to the printer.

14. Apparatus comprising:
a controller to:
    receive print data to control a print head of a printer,
    select, based on at least one characteristic of a print mode of the printer, a coding strategy from a plurality of coding strategies, the at least one characteristic of the print mode selected from among a resolution of the printer, and a number of passes of the print head in printing print data to a substrate, and
    compress or decompress the received print data using the selected coding strategy.

15. Apparatus as claimed in claim 14, wherein the controller is arranged to select the coding strategy from the plurality of coding strategies in response to receiving the print data.

16. Apparatus as claimed in claim 14, wherein the selected coding strategy is a lossless data coding strategy.

17. Apparatus as claimed in claim 14, comprising an electronic device including the controller and communication circuitry to communicate with the printer, wherein the controller is to compress the received print data and the selected coding strategy.

18. Apparatus as claimed in claim 14, comprising the printer including the controller and communication circuitry to communicate with an electronic device, wherein the received print data is from the electronic device, and wherein the controller is to decompress the received print data using the selected coding strategy.

19. Apparatus as claimed in claim 14, further comprising communication circuitry to receive information about the plurality of coding strategies from the printer.

20. Apparatus as claimed in claim 14, further comprising communication circuitry to send information about the plurality of coding strategies to an electronic device for use by the electronic device in compressing print data for sending to the printer.

* * * * *